United States Patent [19]

Ando et al.

[11] Patent Number: 5,097,345
[45] Date of Patent: Mar. 17, 1992

[54] MAGNETIC VIDEO RECORDING APPARATUS

[75] Inventors: Toshizumi Ando; Mitsuru Sato, both of Kanagawa; Kazuyuki Taniguchi; Yoshiyuki Takekawa, both of Tokyo, all of Japan

[73] Assignee: Sony Corporation, Tokyo, Japan

[21] Appl. No.: 322,501

[22] Filed: Mar. 13, 1989

[30] Foreign Application Priority Data

Mar. 17, 1988 [JP] Japan ............................. 63-65189

[51] Int. Cl.[5] ............................................. H04N 9/79
[52] U.S. Cl. ................................... 358/318; 358/315; 358/327
[58] Field of Search ............... 358/310, 314, 315, 316, 358/335, 336, 27, 28, 29, 318, 327, 340; 360/33.1, 38.1

[56] References Cited

U.S. PATENT DOCUMENTS

| | | | |
|---|---|---|---|
| 2,996,576 | 8/1961 | Dolby | 360/38.1 X |
| 3,909,518 | 9/1975 | Baker | 358/336 X |
| 4,321,618 | 3/1982 | Hirose et al. | 360/38.1 X |
| 4,591,898 | 5/1986 | deBoer | 360/38.1 X |
| 4,658,305 | 4/1987 | Tsushima | 358/327 X |
| 4,743,977 | 5/1988 | Yoshioka et al. | 358/310 X |
| 4,884,141 | 11/1989 | Hyakutake | 358/174 X |

Primary Examiner—Roy N. Envall, Jr.
Assistant Examiner—W. R. Young
Attorney, Agent, or Firm—Hill, Van Santen, Steadman & Simpson

[57] ABSTRACT

A magnetic video recording apparatus applicable to a video tape recorder or the like is designed integrally with a television camera. The apparatus has a video signal output unit for outputting first video signals, and a video signal recording unit for recording the first video signals outputting from the video signal output unit or second video signals obtained from an external video appliance. The video signal recording unit records the second video signals via correction means inserted for correcting the video signals to predetermined levels, but bypasses the correction means when recording the first video signals. Such bypass of the correction means eliminates any reduction of the signal-to-noise ratio that may otherwise be caused, hence preventing deterioration of the image quality in the reproduced video signals.

11 Claims, 3 Drawing Sheets

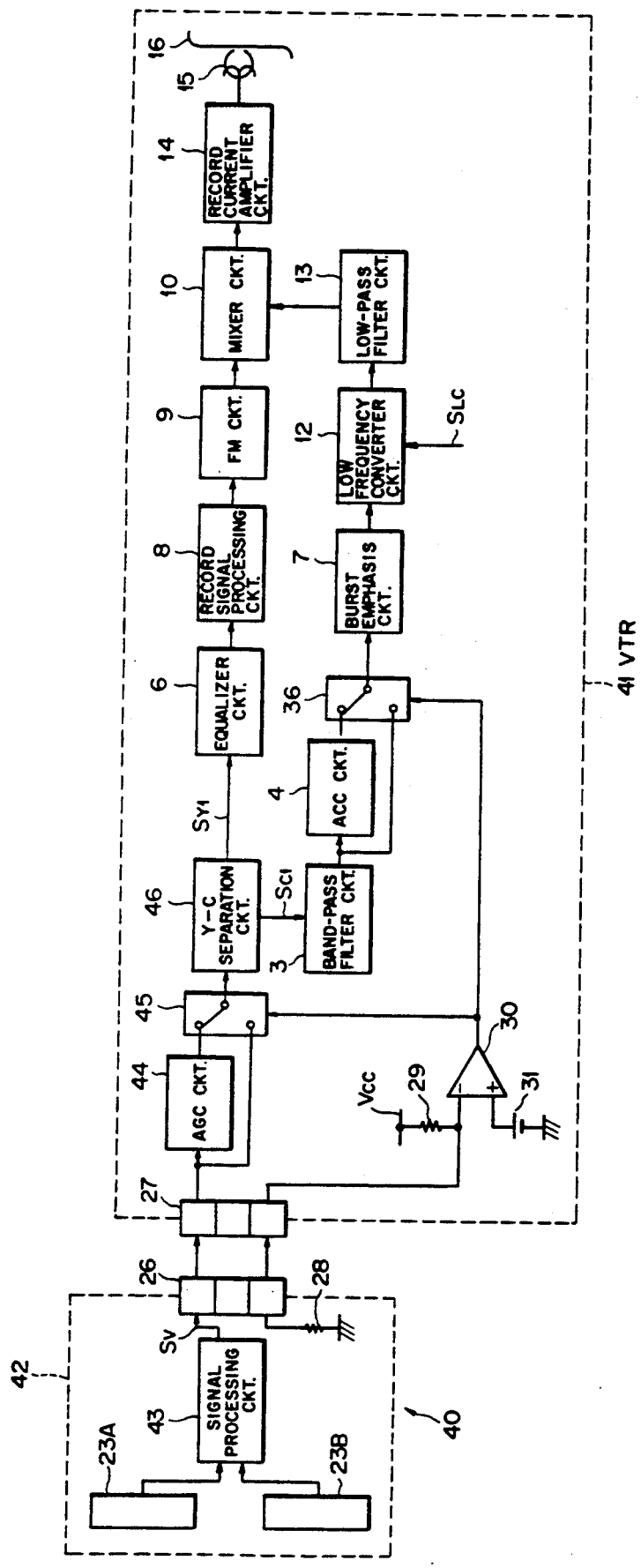

MAGNETIC VIDEO RECORDING APPARATUS

BACKGROUND OF THE INVENTION

1. Field of the Invention

The present invention relates to a magnetic video recording apparatus which is adapted to be applied to, for example, a video tape recorder (VTR) provided with a detachable television camera.

2. Description of the Prior Art

In the conventional video tape recorder, it is customary to employ signal correction circuits such as an AGC (automatic gain control) circuit, an ACC (automatic chroma control) circuit and so forth for correction of the input video signals before recording.

FIG. 1 shows a conventional video tape recorder 1 as a whole wherein a luminance signal Sy is supplied to an AGC circuit 2, while a chrominance signal Sc is supplied to an ACC circuit 4 via a band-pass filter circuit 3.

The AGC circuit 2 and the ACC circuit 4 correct the levels of the luminance signal Sy and the chrominance signal Sc respectively to predetermined signal levels and supply the output signals to an equalizer circuit 6 and a burst emphasis circuit 7, respectively.

Thus, the AGC circuit 2 and the ACC circuit 4 constitute correction circuits which correct levels of the luminance signal Sy and levels of the chrominance signal Sc of the resultant composite video signal.

A record signal processing circuit 8 receives the luminance signal Sy derived from the equalizer circuit 6 and, after processing the same through white clipping and dark clipping stages, supplies the processed signal via an FM (frequency modulation) circuit 9 to a mixer circuit 10.

Meanwhile, a low-frequency converter circuit 12 receives a local oscillation signal $S_{Lc}$ together with the chrominance signal Sc derived from the burst emphasis circuit 7 and, after converting the chrominance signal into a lower frequency signal band, supplies the converted chrominance signal via a low-pass filter circuit 13 to the mixer circuit 10.

In this manner, the frequency-modulated luminance signal and the frequency-converted chrominance signal are obtained via the mixer circuit 10 and then are recorded on a magnetic tape 16 by way of a record current amplifier circuit 14 and a magnetic head 15.

Consequently, even when the luminance signal and the chrominance signal have errors as compared with the standard signal levels due to the influence resulting from some transmission loss or variation in the video appliance that supplies such luminance signal and chrominance signal, it becomes possible, by means of the AGC circuit 2 and ACC circuit 4, to correct both the luminance signal and the chrominance signal to the predetermined signal levels respectively, in order to achieve satisfactory reproduction of the video signal with a high image quality.

The video tape recorded of the type mentioned above is provided with a detachable television camera and functions to record the video signals derived therefrom as well as to record the video signals derived from some other video appliance such as a television receiver.

When the above-described video tape recorder is operated for recording the video signals derived from a television receiver or the like, since there may exist a possibility that the input video signals have some level errors in comparison with reference levels, the respective levels of the luminance signal and the chrominance signal are corrected by means of the AGC circuit 2 and the ACC circuit 4 so that satisfactory video reproduction can be performed with a high image quality.

However, in recording the video signals derived from the television camera detachable from the VTR, the AGC circuit 2 and the ACC circuit 4 equipped in the VTR are used without necessity if the output signal level of the television camera is adjusted exactly to its predetermined reference level. The unnecessary use of the AGC and ACC circuits deteriorates the signal to-noise ratio of the video signal.

OBJECT AND SUMMARY OF THE INVENTION:

It is therefore an object of the present invention to provide an improved magnetic video recording apparatus which is capable of preventing such deterioration of the reproduced image quality. With the invention video signals are recorded while bypassing the signal correction circuits when necessary, thereby preventing deterioration of the reproduced image quality.

For the purpose of achieving the above object, the apparatus of the invention has a video signal output unit for deriving first video signals, and a video signal recording unit for recording the first video signals derived from the video signal output unit or second video signals derived from an external video appliance. The video signal recording unit records the second video signals via signal correction circuits inserted for correcting the video signals to predetermined levels, but bypasses the signal correction circuits when recording the first video signals.

According to one aspect of the present invention, there is provided an improved apparatus comprising signal input means supplied with at least video signals to be recorded. A signal processing means is connected to the signal input means for converting the video signals into a form suitable for recording. The signal processing means includes at least level control circuits selectively inserted in the signal paths of the video signals in accordance with a control signal. Signal recording means is connected to the signal processing means for recording the converted video signals on a magnetic tape by a magnetic head means.

BRIEF DESCRIPTION OF THE DRAWINGS

FIG. 3 is a block diagram of a second embodiment of the invention.

DETAILED DESCRIPTION OF THE PREFERRED EMBODIMENTS

Hereinafter exemplary embodiments of the present invention will be described in detail with reference to the accompanying drawings.

First Embodiment

Figure 1:
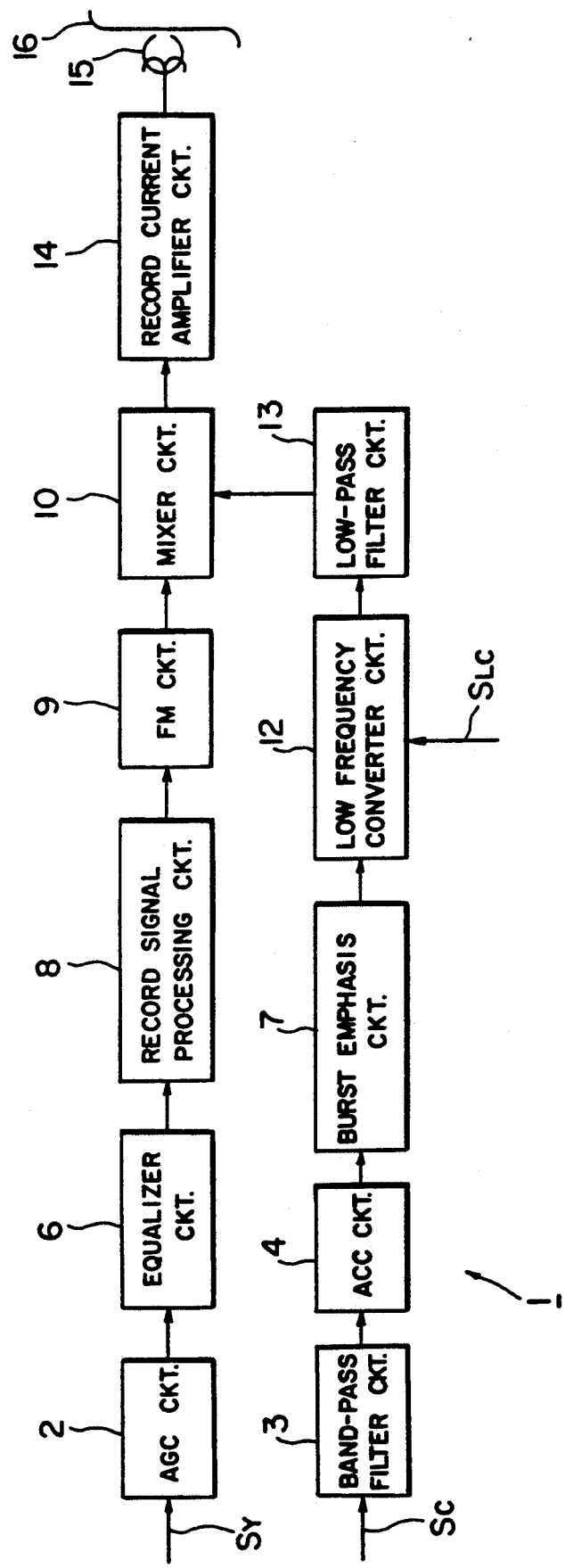
FIG. 1 is a block diagram of a conventional magnetic video recording apparatus.
Figure 2:
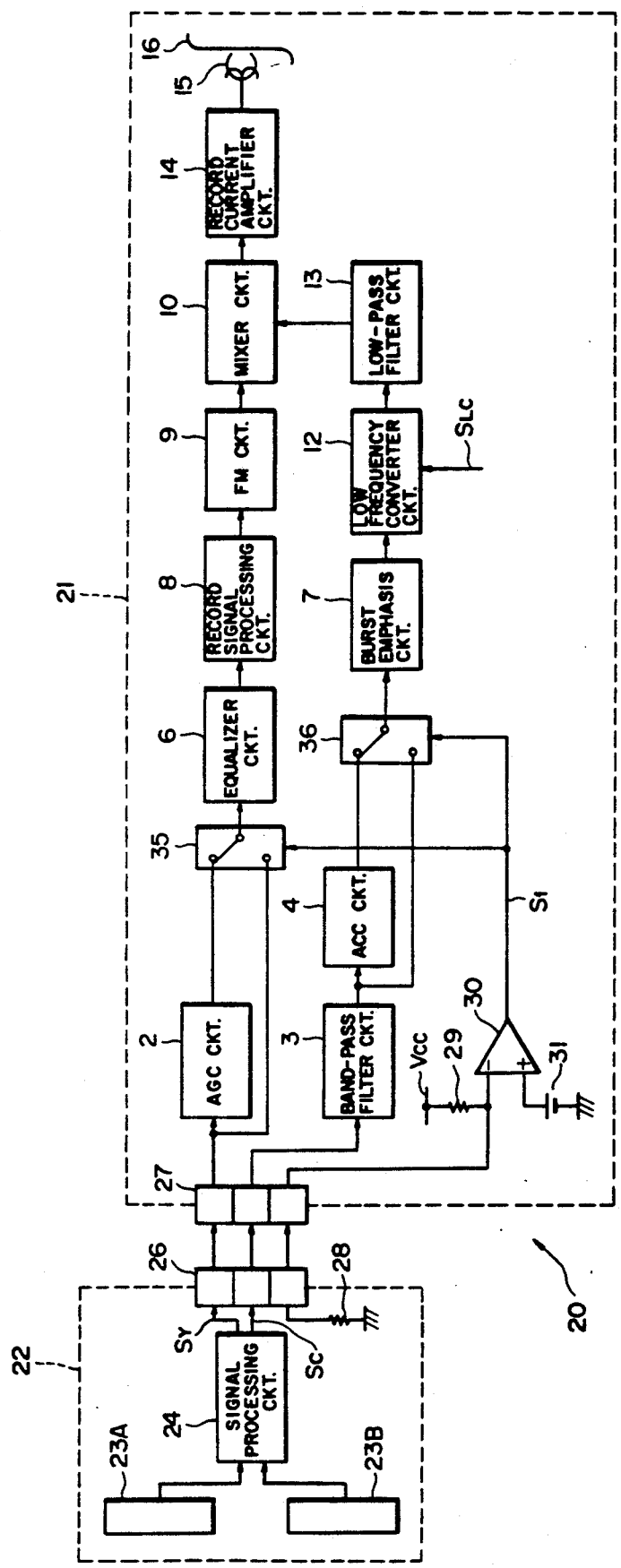
FIG. 2 is a block diagram of an exemplary magnetic video recording apparatus embodying the present invention.

In the block diagram of FIG. 2 where the same components as those employed in the conventional example of FIG. 1 are denoted by the same reference numerals, there is shown a video tape recorder 20 as a whole which is detachable from a television camera. By detaching an image sensing unit 22 from a VTR unit 21, the latter is rendered capable of recording video signals derived from a television receiver or the like, while the image sensing unit 22 can be used as a television camera independently.

The image sensing unit or television camera 22 supplies a chrominance signal and a luminance signal obtained from image pickup elements 23A and 23B respectively to a signal processing circuit 24, and the luminance signal Sy and the chrominance signal Sc obtained as a result are fed to the VTR unit 21 via a connector 26.

Thus, the image sensing unit 22 constitutes a video signal output section for supplying to the VTR unit 21 the video signal which is composed of the luminance signal Sy and the chrominance signal Sc.

The connector 26 is so formed as to be coupled to another connector 27 in the VTR unit 21 when the image sensing unit 22 is attached to the VTR unit 21. Thus, the luminance signal Sy and the chrominance signal Sc are fed from the image sensing unit 22 to the VTR unit 21, while a required power and so forth is supplied from the VTR unit 21 to the image sensing unit 22.

A grounded resistor 28 is connected to one of the contacts of the connector 26, and one contact of the connector 27 corresponding thereto is connected to a power source Vcc through a resistor 29 and also to an inverting input terminal of a comparator 30.

When a reference power source 31 is connected to the non-inverting input terminal of the comparator 30 while the inverting input terminal thereof is grounded via the resistor 28, the comparator 30 is capable of detecting that the image sensing unit 22 is connected to the VTR unit 21.

The VTR unit 21 is so formed that the luminance signal Sy is fed to the AGC circuit 2, and the input or output signal thereof is fed to the equalizer circuit 6 via a selector circuit 35.

Similarly, in the VTR unit 21, the chrominance signal Sc is fed to the ACC circuit 4 via a band-pass filter circuit 3, and the input or output signal of the ACC circuit 4 is fed via a selector circuit 36 to the burst emphasis circuit 7.

The selector circuits 35 and 36 serve to switch the contacts in accordance with a switching signal S1 supplied from the comparator 30 and, upon connection of the image sensing unit 22 to the VTR unit 21, the selector circuits 35 and 36 select the input signals of the AGC circuit 2 and the ACC circuit 4 respectively.

Therefore, the luminance signal Sy and the chrominance signal Sc derived from the image sensing unit 22 are recorded while the AGC circuit 2 and the ACC circuit 4 are bypassed. Thus, a decrease of the signal-to-noise ratio can be effectively averted to consequently prevent deterioration of the reproduced image quality.

Meanwhile, when a luminance signal and a chrominance signal are supplied from a television receiver or the like via the connector 27, and nothing is connected to the non-inverting input terminal of the comparator 30 through to the connector 27, the contacts of the selector circuits 35 and 36 are changed to select the output signals of the AGC circuit 2 and the ACC circuit 4. Thus, the luminance and chrominance signals are corrected to predetermined levels before recording.

In this manner, the AGC circuit 2 and the ACC circuit 4 can be bypassed when necessary in recording the video signals, hence preventing deterioration of the reproduced image quality by an amount corresponding to such bypass.

Thus the VTR unit constitutes a video signal recording section for recording the video signal composed of a luminance signal Sy and a chrominance signal Sc obtained from the image sensing unit 22, or the video signal supplied from an external video appliance. Meanwhile the AGC circuit 2 and the ACC circuit 4 constitute correction circuits for correcting the video signals to predetermined signal levels.

In the above form, the luminance signal Sy and the chrominance signal Sc derived from the image sensing unit 22 are recorded on the magnetic tape 16 while the AGC circuit 2 and the ACC circuit 4 are bypassed since the contacts of the selector circuits 35 and 36 are switched so as to select the input signals of the AGC circuit 2 and the ACC circuit 4.

In contrast therewith, the luminance signal and the chrominance signal supplied from the television receiver or the like are first corrected to predetermined levels via the AGC circuit 2 and the ACC circuit 4 and then are recorded on the magnetic tape 16, since in this case the contacts of the selector circuits 35 and 36 are so switched as to select the output signals of the AGC circuit 2 and the ACC circuit 4.

According to the design mentioned above, the AGC circuit 2 and the ACC circuit 4 are bypassed in recording the luminance signal Sy and the chrominance signal Sc derived from the image sensing unit 22, so that deterioration of the reproduced image quality can be prevented by an amount corresponding to such bypass.

Second Embodiment:

In the block diagram of FIG. 3 where the same components as those employed in the first embodiment of FIG. 2 are denoted by the same reference numerals, there is shown a video tape recorder 40 as a whole integrally provided with a television camera and so arranged that a video signal Sv, in place of the aforementioned luminance signal Sy and chrominance signal Sc, is fed from an image sensing unit 42 to a VTR unit 41.

In the image sensing unit 42, a signal processing circuit 43 combines the output signals of image pickup elements 23A and 23B with each other to form a composite video signal Sv and feeds the same via connectors 26 and 27 to an AGC circuit 44 in the VTR unit 41.

A selector circuit 45 receives the input and output signals of the AGC circuit 44 and changes the contacts thereof in accordance with a switching signal S1.

Therefore, the AGC circuit 44 is bypassed in processing the video signal Sv derived from the image sensing unit 42, but the AGC circuit 44 is inserted for the video signal derived from a television receiver or the like, so as to correct the signal level thereof.

A Y-C separation circuit 46 separates the video signal Sv into a luminance signal Svl and a chrominance signal Scl and then feeds such separated signals respectively to an equalizer circuit 6 and a band-pass filter circuit 3.

Thus, the video signal Sv derived from the image sensing unit 42 can be recorded while both the AGC circuit 44 and the ACC circuit 4 are bypassed. In contrast therewith, the video signal derived from a television receiver or the like can be recorded after being corrected to a predetermined level.

Due to the above-described design, it becomes possible, when recording the video signal in place of the aforementioned luminance signal and chrominance signal, to attain a satisfactory effect similar to that in the first embodiment.

It is to be understood that the present invention is not limited merely to the above embodiments which represent exemplary cases of applying, the invention to a video tape recorder provided detachable from a television camera. And the invention is widely applicable also to, for example, a still image recording/reproducing apparatus using a magnetic disc to record still pictures thereon.

According to the present invention, as described hereinabove, video signals are recorded while correction circuits are bypassed when necessary to consequently avert reduction of the signal-to-noise ratio, hence preventing deterioration of the reproduced image quality.

Although various minor changes and modifications might be proposed by those skilled in the art, it will be understood that we wish to include within the claims of the patent warranted hereon all such changes and modifications as reasonably come within our contribution to the art.

What is claimed is:

1. A magnetic video recording apparatus, comprising:

a video signal input supplied with at least a first video signal which requires level correction to a reference level desired for recording prior to the recording and a second video signal which is already pre-adjusted to said reference level desired for recording;

a control signal input supplied with a control signal indicating whether the first or second video signal is present;

signal processing means connected to said video signal input for converting said video signals into a form suitable for recording, said signal processing means including at least one level control circuit, said level control circuit causing a signal-to-noise ratio deterioration of video signals passing therethrough; and switching means connected to said control signal input and controlled by said control signal for switching in the level control circuit such that the video signals at the video signal input pass through the level control circuit when the first video signal is to be recorded as indicated by the control signal, and for completely bypassing and not using the level control circuit and connecting the second video signal to a stage which follows the level control circuit employed for recording when the control signal indicates that the second video signal is to be recorded, whereby the signal-to-noise deterioration caused by said level control circuit is avoided when the second video signal is recorded.

2. An apparatus according to claim 1 wherein said first video signal comprises signals from a television receiver and said second video signal comprises signals from a television camera.

3. An apparatus according to claim 1 wherein said second video signal comprises signals from a television camera.

4. An apparatus according to claim 1 wherein said second video signal comprises signals from a television camera having a plug means for detachable connection to the video signal input.

5. An apparatus according to claim 1 wherein said control signal at said control signal input comprises a signal from a television camera and wherein said switching means determines that a television camera has been connected to the signal processing means and that the second video signal is thus present at the video signal input.

6. An apparatus according to claim 1 wherein said switching means comprises reference detection means having a reference power source which is compared to a reference voltage provided at said control signal input indicating that a television camera is being connected, and that the level control circuit should be bypassed since the second video signal is present.

7. An apparatus according to claim 1 wherein said second video signal comprises signals from a television camera which have been pre-adjusted to said predetermined level for recording.

8. An apparatus according to claim 1 wherein two level control circuits are provided, one for AGC and one for ACC, and wherein said switching means bypasses both of said circuits when said second video signal is present.

9. An apparatus according to claim 1 wherein the first and second video signals each comprise separate luminance signals and separate chrominance signals, and wherein the chrominance signals are connected to an ACC level control circuit and the luminance signals are connected to an AGC level control circuit, and wherein said switching means bypasses both of the level control circuits when the second video signal is present.

10. An apparatus according to claim 1 wherein the video signals comprise composite luminance and chrominance signals, wherein a luminance and chrominance signal separation circuit is provided, and wherein an AGC circuit for both the luminance and chrominance signals and an ACC circuit for chrominance signals only is provided, and said switching means bypasses both the ACC and AGC circuit when the second video signals are present.

11. A magnetic video recording apparatus, comprising:

a video signal input means for supplying at least a first video signal which requires level correction to a reference level desired for recording prior to the recording or a second video signal which is already pre-adjusted to said reference level desired for recording;

a control signal input means for supplying a control signal indicating whether the first or second video signal is present;

signal processing means connected to said video signal input means for converting said video signals into a form suitable for recording, said signal processing means including at least one level control circuit means for adjusting the first video signal input thereto to said reference level, said level control circuit means causing a signal-to-noise ratio deterioration of the first video signal passing therethrough; and switching means connected to said control signal input means and controlled by said control signal for switching in the level control circuit means such that the video signals at the video signal input pass through the level control circuit means when the first video signal is to be recorded as indicated by the control signal, and for completely bypassing and not using the level control circuit means and connecting the second video signal to a stage which follows the level control circuit means employed for recording when the control signal indicates that the second video signal is to be recorded, whereby the signal-to-noise deterioration caused by said level control circuit means is avoided when the second video signal is recorded.

* * * * *